United States Patent [19]

Fukunaga et al.

[11] Patent Number: 5,207,105
[45] Date of Patent: May 4, 1993

[54] ELECTROMAGNETIC FLOW METER

[75] Inventors: Masao Fukunaga; Ikuo Uematsu, both of Katsuta; Masahiro Ikegawa; Masayuki Kaiho, both of Ibaraki, all of Japan

[73] Assignee: Hitachi, Ltd., Tokyo, Japan

[21] Appl. No.: 538,092

[22] Filed: Jun. 14, 1990

[30] Foreign Application Priority Data

Jun. 16, 1989 [JP] Japan .................................. 1-154043
Sep. 14, 1989 [JP] Japan .................................. 1-238448

[51] Int. Cl.$^5$ .................................................. G01F 1/58
[52] U.S. Cl. ................................. 73/861.12; 73/861.11
[58] Field of Search ............ 73/861.12, 861.16, 861.17

[56] References Cited

U.S. PATENT DOCUMENTS

| | | | |
|---|---|---|---|
| 2,696,737 | 12/1954 | Mittelmann | 73/861.16 |
| 2,844,568 | 7/1958 | Mertz | 73/861.16 X |
| 4,214,477 | 7/1980 | Schmoock | . |
| 4,434,666 | 3/1984 | Hemp et al. | 73/861.12 |
| 4,470,309 | 9/1984 | Wada | 73/861.12 |
| 4,499,754 | 2/1985 | Akano et al. | 73/861.12 |
| 4,658,653 | 4/1987 | Tomita | 73/861.12 |
| 4,676,112 | 6/1987 | Uematsu et al. | 73/861.17 |
| 4,774,844 | 10/1988 | Davis | 73/861.12 |

FOREIGN PATENT DOCUMENTS

| | | |
|---|---|---|
| 1498397 | 6/1969 | Fed. Rep. of Germany . |
| 1573066 | 10/1970 | Fed. Rep. of Germany . |
| 2040682 | 2/1972 | Fed. Rep. of Germany . |
| 3401488 | 3/1985 | Fed. Rep. of Germany ... 73/861.12 |
| 0020613 | 2/1982 | Japan ........................... 73/861.12 |
| 0228119 | 12/1984 | Japan . |
| 0234111 | 9/1988 | Japan . |
| 0126511 | 5/1989 | Japan ........................... 73/861.16 |

OTHER PUBLICATIONS

Neue Kompakte Magnetisch-Induktive Durchflussmesser mit Digitaler Signalverarbeitung, F. Hoffman (May 1988), pp. 240-245.

*Primary Examiner*—Herbert Goldstein
*Assistant Examiner*—Elizabeth L. Shopbell
*Attorney, Agent, or Firm*—Antonelli, Terry, Stout & Kraus

[57] ABSTRACT

An apparatus in which a magnetic field is generated by an excitation coil provided in the outside of a conduit and electromotive force generated in electrodes attached on the conduit is detected to thereby measure a flow rate of a fluid flowing in the conduit, in which the conduit is made thinner in a manner so that a ratio of the axial length of the conduit to the inside diameter of the conduit is set to a value within a range of from 0.2 to 1.0, and in which correction data previously analyzed in accordance with magnetic permeability and inside surface conductivity of a mate piping to which the conduit is to be connected are stored so that a detection signal from the electrodes is corrected on the basis of the correction data to thereby measure the flow rate of the fluid flowing in the conduit.

18 Claims, 8 Drawing Sheets

FIG. 7
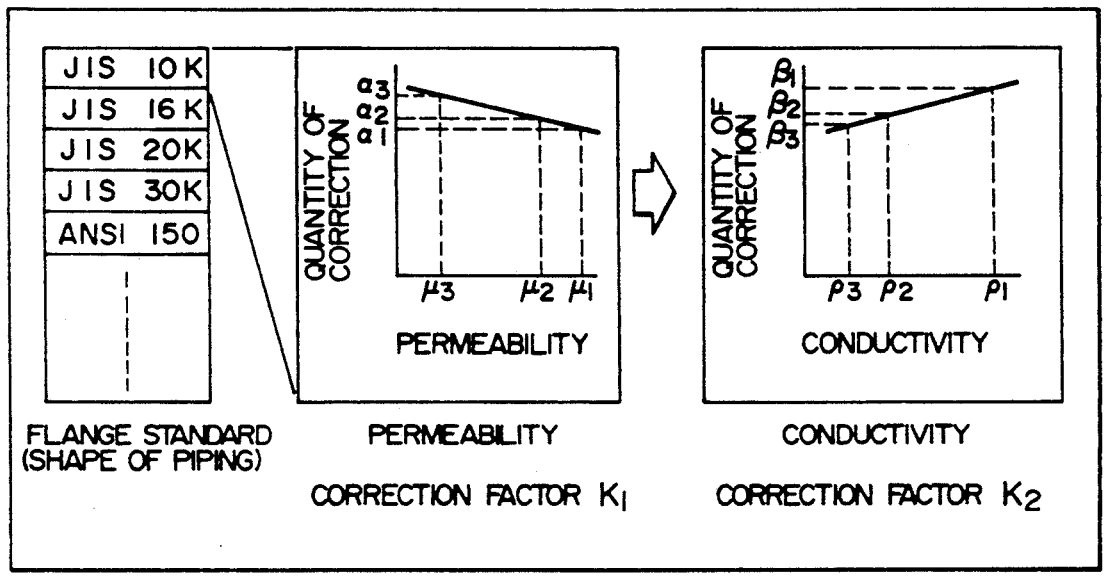
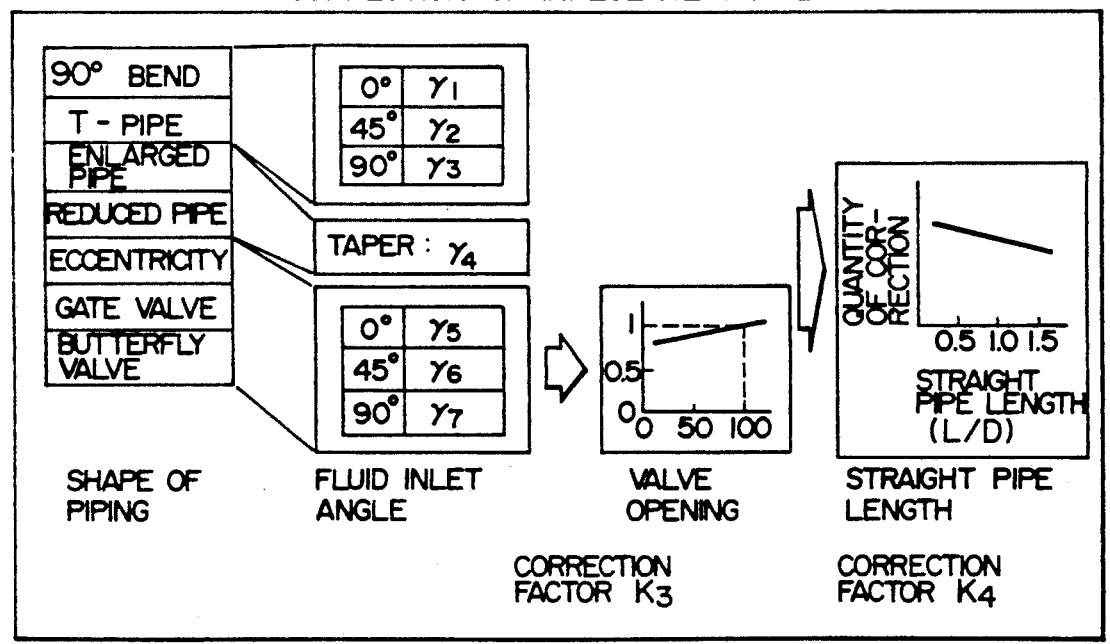

ELECTROMAGNETIC FLOW METER

BACKGROUND OF THE INVENTION

The present invention relates to an electromagnetic flow meter, and more particularly to an improvement of making the conduit thinner in the detection portion of the electromagnetic flow meter and a flow rate detection correcting device.

The basic configuration of an electromagnetic flow meter is defined in "Flow Rate Measuring Method By Means of an Electromagnetic Flow Meter" JIS, Z8764. The basic configuration shown in FIG. 2 provides for an excitation current I flowing into an excitation coil 21 provided outside a conduit 20 so that a magnetic field B is generated from the end portion of a core 22. Electromotive force generated in the fluid flowing in the conduit 20 is detected by an electrode 23, and the detected electromotive force is converted by a converter 25 into a flow-rate signal. The conduit 20, the excitation coil 21, the electrode 23, and so on, are built in a detector 24.

Generally, such an electromagnetic flow meter is provided in the form of piping. In this case, there is a defect in which the inter-surface distance L (see FIG. 2) of the detector 24 is large causing the weight of the conduit 20 the to increase this in return causes workability of attaching the conduit 20 to the piping to be lowered or; lacing lining on the inner surface of the conduit 20 becomes difficult.

Accordingly, trials to shorten the intersurface distance L have been made and it has been recognized that the inter-surface distance L must be selected so as not to be shorter than 1.3 times as long as the inside diameter D of the conduit 20. This is because if the inter-surface distance L is shortened, the electromotive force becomes low so that the signal-to-noise ratio, that is, S/N, becomes low by being affected by a mate piping. Thus, it has been recognized experientially that the ratio of the inter-surface distance L to the inside diameter D of the conduit must be selected to be 1.3 at the least, and this recognition has become common knowledge. However, nothing having a ratio smaller than 1.3 has been put into practical use.

SUMMARY OF THE INVENTION

It has been qualitatively known that if the inter-surface distance of an electromagnetic flow meter is shortened, there occurs a disturbance in magnetic field or a decrease in electromotive force. There have been no experimental data obtained by quantitatively analyzing the occurrence of such a disturbance in magnetic field or such a decrease in electromotive force accordingly no specific proposals have been suggested to shorten the inter-surface distance.

It is a first object of the present invention to provide an electromagnetic flow meter in which the accuracy of the flow rate measurement can be maintained or improved in the case where the inter-surface distance of the detector is shortened or even in the case where it is not shortened.

A second object of the present invention is to provide an electromagnetic flow meter in which the inter-surface distance of the detector can be shortened.

A third object of the present invention is to provide a specific configuration of an electromagnetic flow meter which is optimum to shorten the inter-surface distance of the detector.

In order to achieve the above objects of the present invention, the inventors of the present invention executed computer analysis. More specifically, the inventors carried out three dimensional analysis with respect to the magnetic field, electric field, and fluid to determine the relationship between the electromotive force of the detector and those three factors. The analysis allowed the inventors to succeed in quantitatively verifying various phenomena which could be recognized merely by experientially and have obtained the countermeasure as follows.

That is, in order to achieve the above-mentioned first object, in the electromagnetic flow meter according to the present invention, a means is provided for correcting a detection output in accordance with the conditions of a mate piping to which the electromagnetic flow meter is connected.

In order to achieve the above-mentioned second object in the electromagnetic flow meter according to the present invention, the ratio of the inter-surface distance to the inside diameter is selected to be a value within a range of from 0.1 to 1.0.

As for the above-mentioned third object, the present invention provides the relationship between the inter-surface distance and the coil length, the attachment structure between the coil and the core, the attachment structure between the core and the mate piping, and so on, which will be described in detail in the description with respect to embodiments later.

BRIEF DESCRIPTION OF THE DRAWINGS

FIG. 7 is a detailed setting view of the setting parameters and correction data;

DESCRIPTION OF THE PREFERRED EMBODIMENTS

Figure 3:
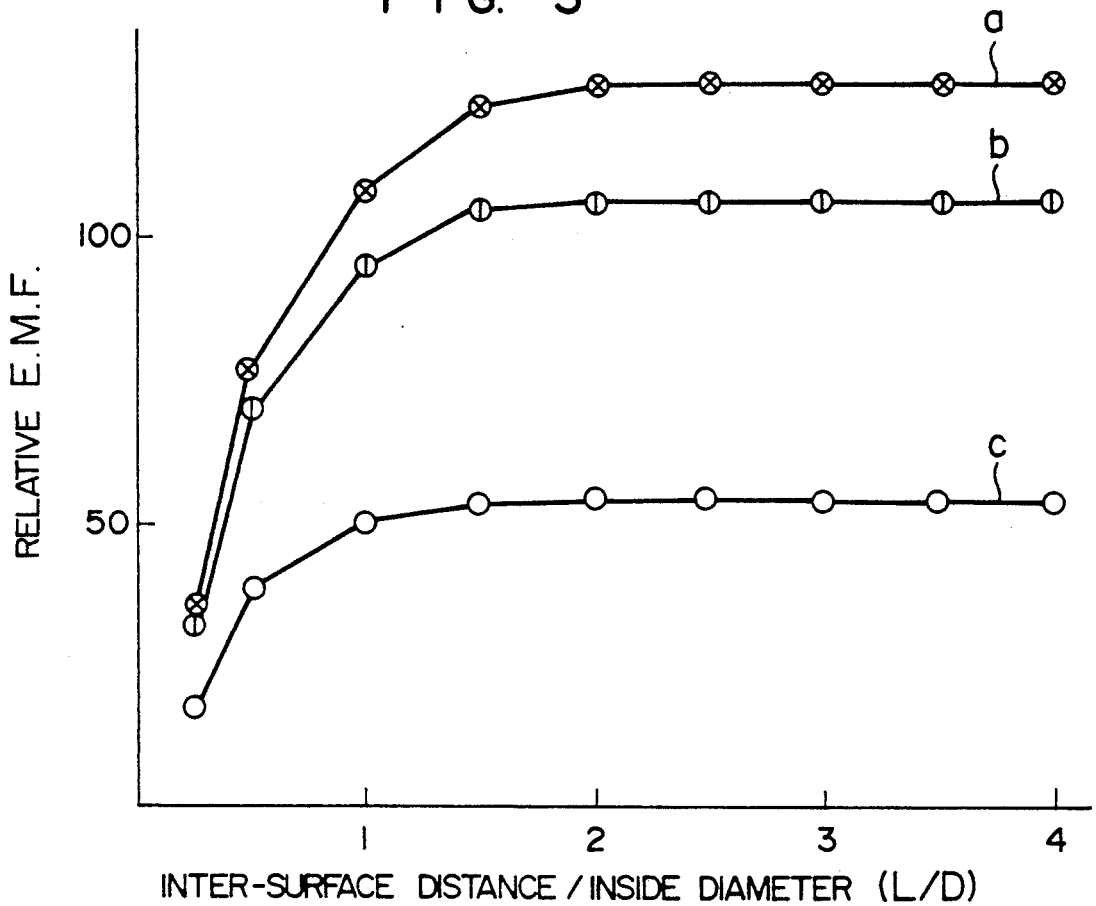
FIGS. 3 and 4 are diagrams showing the results of three dimensional analysis, which has become the basis of the present invention, with respect to the relationship between, the intersurface distance and relative electromotive force.

FIG. 3 shows an example of the results of the above-mentioned three dimensional analysis with respect to the magnetic field, electric field and fluid. FIG. 3 shows the relative electromotive force with respect to the ratio of the inter-surface distance to the inside diameter with the ratio of the coil length to the inter-surface distance as the parameter. The curves a, b and c show the cases where the ratio of the coil length to the inter-surface distance is selected to be 1.1, 0.6 and 0.1 respectively. From those curves, it can be found that the electromotive force becomes low only by about 25% even if the inter-surface distance is made to be only half the size of the inside diameter. Accordingly, the electromotive force is not really affected when the coil length is made to be 0.6 times or more of the inter-surface distance, and the electromotive force becomes low only by about a half even if the coil length is made to be 0.6 times of the intersurface distance.

Figure 4:
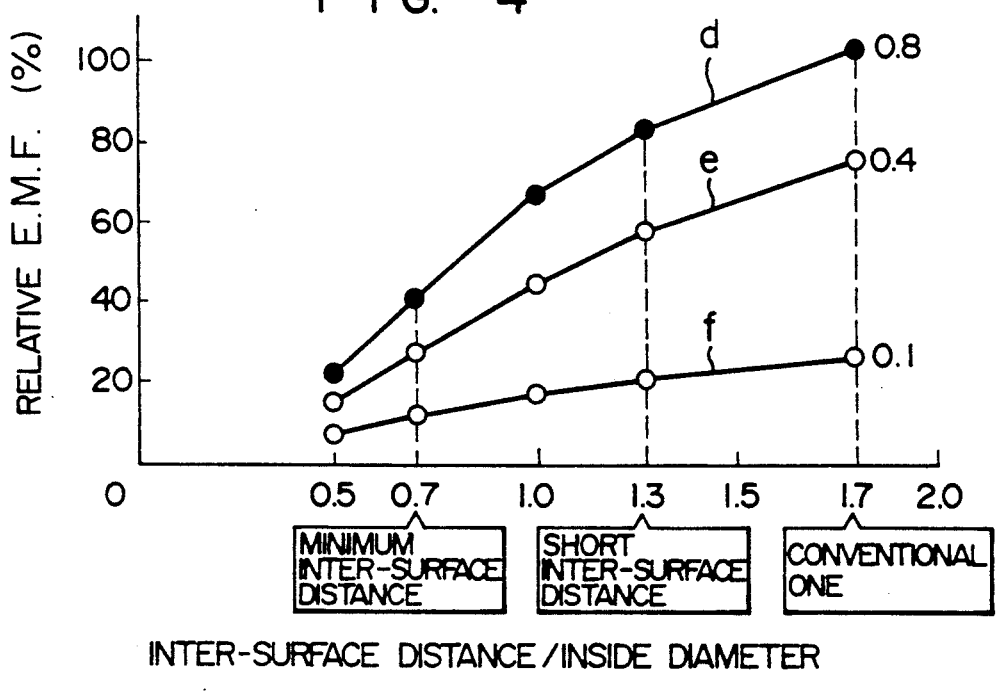

FIG. 4 shows the result of a detailed analysis with respect to the same relationship as that of FIG. 3. In FIG. 4, the curves d, e and f show the cases where the ratio of the coil length to the intersurface distance is selected to be 0.8, 0.4 and 0.1 respectively. From those curves, it can be found that if the ratio of the coil length to the inter-surface distance is selected to be 0.8 (curve d), the electromotive force becomes low only by about a half even though the ratio of the inter-surface distance to the inside diameter is reduced from 1.3 to 0.7 which has been considered as a limit. Further, the ratio of the inter-surface distance to the inside diameter can be reduced to about 0.2 by means of correction which will be described later.

Further, with respect to the conditions of installation, such as the influence of the material and shape of a mate piping, and the influence of bent pipe portions and valves which is giving onto flow rate distribution, it is impossible to secure the accuracy only through indiscriminate correction even if sensitivity reduction is corrected.

The influence given by a mate piping when the inter-surface distance is reduced has two causes as follows:

① The magnetic flux density at a measurement portion varies depending on the fact whether the mate piping is made of a magnetic material or a non-magnetic material, resulting in a span influence; and ② The short-circuit effect of the electromotive force at a measurement portion varies depending on the fact whether the inside surface of a mate piping is of a magnetic material or a non-magnetic material, resulting in a span influence.

Figure 5:
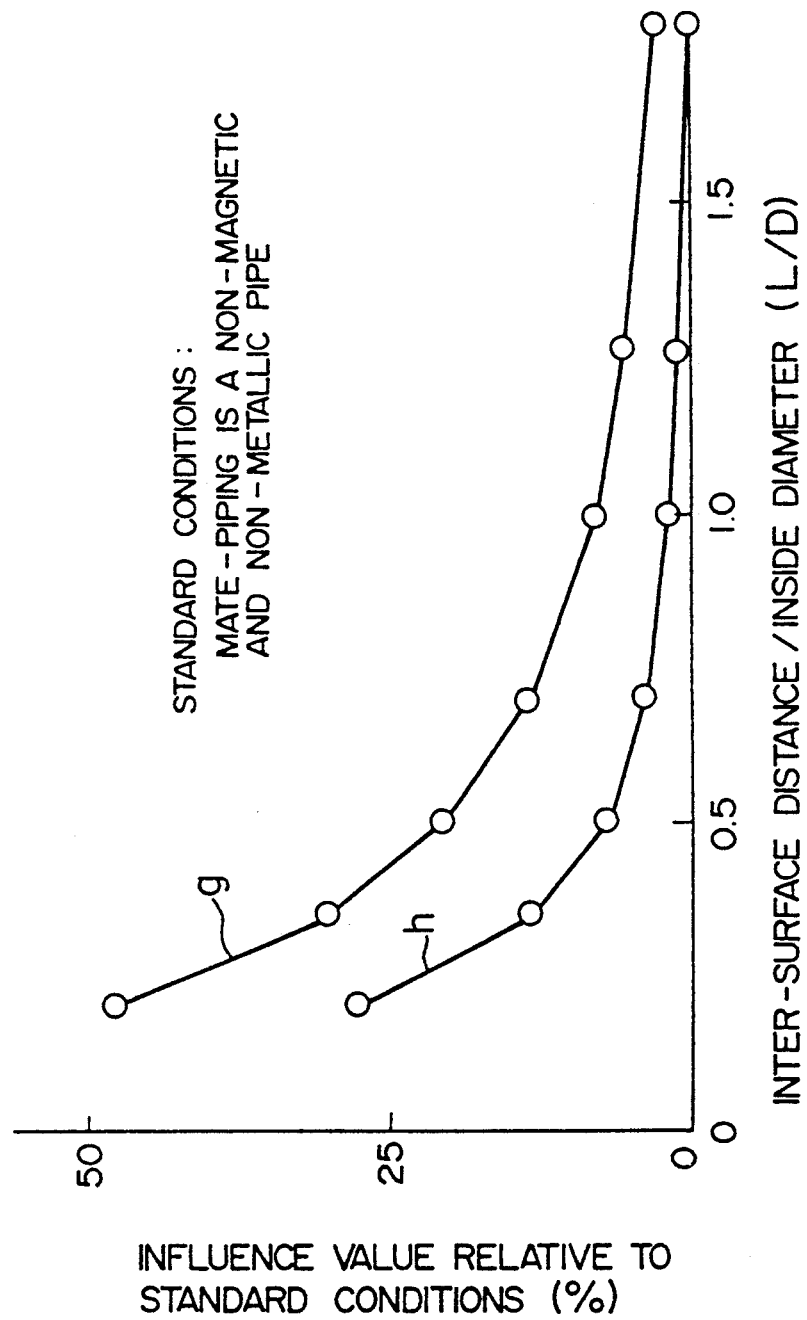
FIG. 5 is a diagram showing the influence given by the conditions of the conduit and obtained through computer analysis.

FIG. 5 shows the respective influence values obtained through aforementioned computer analysis. In FIG. 5, the relationship between the ratio of the inter-surface distance to the inside diameter and the influence values relative to the standard condition with the material of the mate piping as parameters. That is, the curves g and h show the influence values in the cases where the mate piping is made of a magnetic material and a metal material respectively. The standard condition is that the mate piping is made of a non-magnetic and non-metallic material.

In order to correct the above influence, therefore, by inputting the flange standard, permeability, inside surface conductivity, etc., of the mate piping as setting parameters, the reduction of the sensitivity of the electromagnetic flow meter and the above influence values can be corrected by using span correction data obtained by analysis in advance.

The same applies to the influence onto the flow of fluid due to the conditions of piping. That is, by inputting parameters, such as the straight pipe length, the fluid inlet angle, the taper of enlargement/reduction, the valve opening, and the degree of eccentricity as parameters, the above influence values onto the electromagnetic flow meter can be corrected by using span correction data obtained by analysis in advance.

Thus, even if there is an influence by a mate piping when the inter-surface distance is shortened, it is possible to eliminate the influence so as to measure the flow rate with high accuracy and it is possible to obtain accuracy necessary for practical use with the ratio of the inter-surface distance to the inside diameter selected over a range of from 0.2 to 1.0.

Referring to the drawings, an embodiment of the electromagnetic flow meter according to the present invention will be described hereunder.

Figure 1:
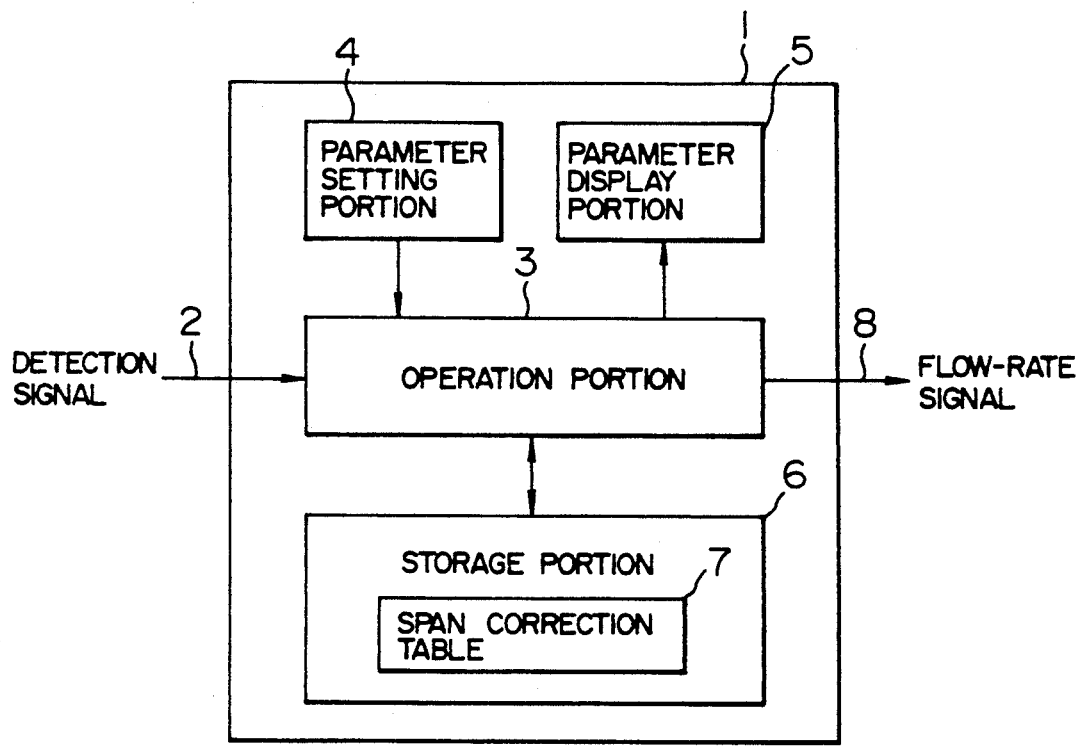
FIG. 1 is a block diagram of an embodiment of the correction operation portion of the electromagnetic flow meter.
Figure 2:
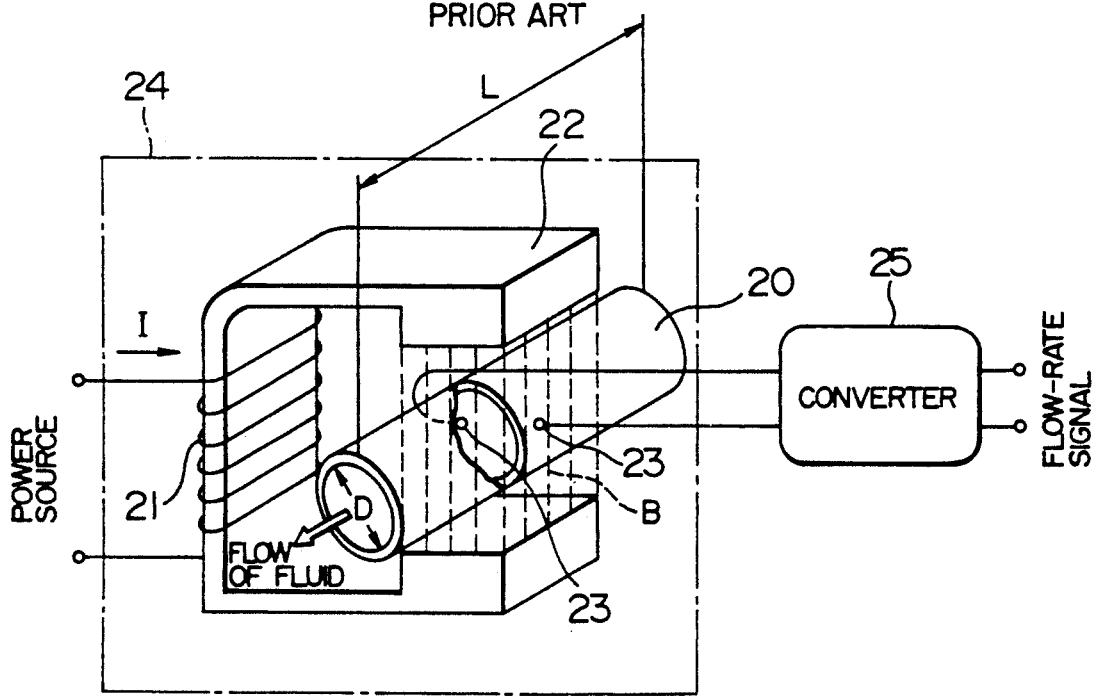
FIG. 2 is a schematic perspective view showing an example of the general configuration of conventional electromagnetic flow meters.

FIG. 1 shows a correction operation portion 1 of the electromagnetic flow meter according to the present invention. As shown in the drawing, the correction operation portion 1 is provided with a parameter setting portion 4 for setting parameters necessary for performing correction operation on the flow rate of the fluid flowing in a conduit 20, a parameter display portion 5 for indicating the values of the parameters set in the parameter setting portion 4, a storage portion 6 for storing previously analytically obtained correction data in a span correction table 7, and an operation portion 3 for selecting, when parameters are set in the parameter setting portion, span correction data from those data stored in the span correction table 7 correspondingly to the set parameters so as to calculate the flow rate of the fluid while performing the span correction on the basis of the selected span correction data.

An input signal 2 from a detector 24 of the electromagnetic flow meter is converted into a flow rate signal 8 by the operation portion 3 in the correction operator 1 and the flow rate signal 8 is put out as an output. On the other hand, in order to correct the sensitivity reduction and influence due to the shortening of the inter-surface distance L, various kinds of parameters set in the parameter setting portion 4 are supplied to the storage portion 6 while the contents of the parameters are being confirmed in the parameter display portion 5. The correction data previously analytically obtained corresponding to the set parameters have been stored in the span correction table 7, and the correction data under the parameter conditions are selected so that span correction operation is performed in the operation portion 3 on the basis of the selected correction data.

Figure 6:
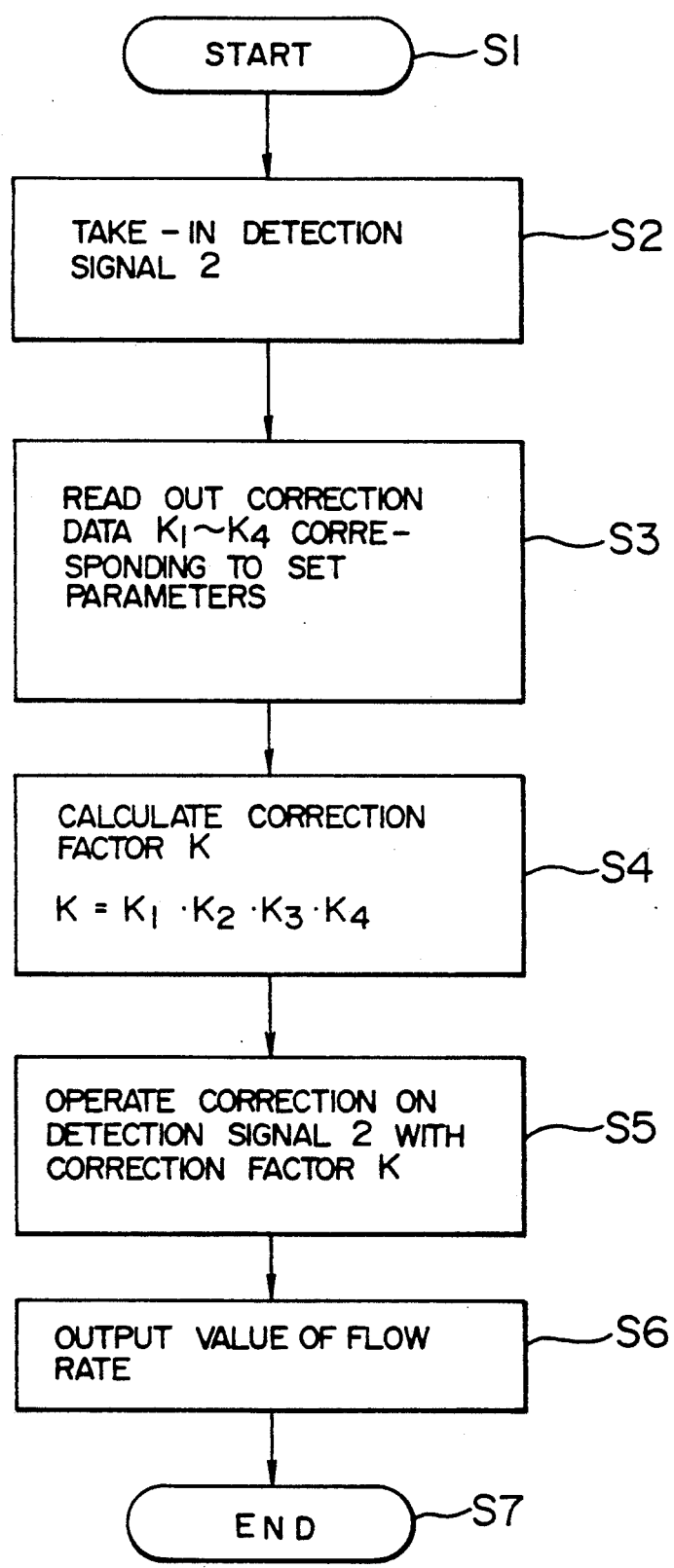
FIG. 6 is a flow chart of the correction operation in the correction operation portion according to the present invention.

FIG. 6 is a flow chart of the program of the above-mentioned correction operation executed in the operation portion 3. The contents of steps S3 and S4 in the drawing will be further described in FIG. 7.

FIG. 7 is a view for explaining the contents of the set parameters and the correction data more in detail. The correction operation is roughly classified into the correction for the influence on the electromagnetic field and the correction for the influence on the flow. In order to correct the influence of the electromagnetic field, a piping shape JIS 10K - ANSI 150 in the flange standard is selected so as to determine the shape of the mate piping, and correction factors K1 and K2 of permeability and conductivity corresponding to the selected piping shape are selectively determined. As for the permeability, there occurs no problem in practical use if various values of permeability are calculated in advance as to the respective qualities of several piping materials, for example, iron of a ferromagnetic material, vinyl chloride of non-magnetic material, and stainless steel in the middle of the two. As for the conductivity, there occurs no problem in practical use if various values of conductivity are calculated in advance as to iron, vinyl chloride, and iron plated with zinc.

Next, in order to correct the influence onto the flow, first, the shape of piping (90° bend, T-shaped pipe, etc.) is selected, and the quantity of correction on the basis of a fluid inlet angle is determined correspondingly to the selected shape. As for enlarged pipes and reduced pipes, since the influence on the flow has no dependency on the fluid inlet angle, the quantity of correction depending on a taper value is determined. Further, as for gate valves and butterfly valves, since the influence on the flow has dependency on the valve opening, it is necessary to determine the quantity of correction depending on the valve opening. Finally, the quantity of correction depending on the length of straight pipes is determined on the basis of the above results. Assuming that the quantity of correction depending on the fluid inlet angle, the taper, and the valve opening is represented by K3 and the quantity of correction depending on the straight pipe length is represented by K4. That is, K3 and K4 are the correction factors for the influence onto the flow. Then, the correction factor K for the total influences on the electromagnetic field and the flow is expressed as follows:

$$K = K1 \cdot K2 \cdot K3 \cdot K4 \quad (1)$$

As described above, in the embodiment, the influence of the mate piping which is caused by reduction of the inter-surface distance is analytically obtained in advance, the obtained result is inputted in the span correction table also in advance, and only the parameters for determining the conditions of piping are inputted in use. Accordingly, it becomes possible to correct the influence of the mate piping and it is made possible to put into practical use an electromagnetic flow meter having high accuracy and having its inter-surface distance made not larger than its inside diameter, which has been considered difficult to realize because it has been considered that the values of complicated influences due to the conditions of the mate piping could not be corrected.

Figure 8A:
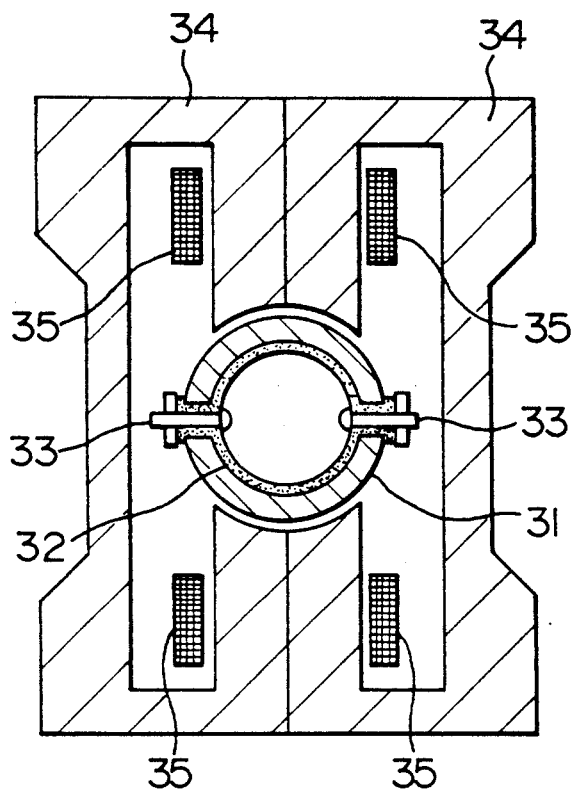
FIGS. 8A and 8B shows the configuration of an embodiment of the electromagnetic flow meter according to the present invention.
Figure 8B:
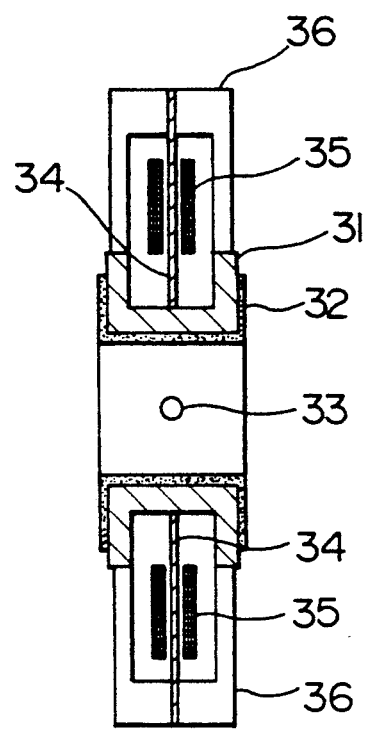

Referring to FIG. 8, a specific embodiment of the electromagnetic flow meter, particularly the detecting portion thereof, according to the present invention will be described hereunder. In FIG. 8, the diagram (a) is a section in a plane perpendicular to the axial direction and the diagram (b) is a section in a plane along the axial direction. In the diagrams (a) and (b), there is provided a cylindrical conduit 31 made of a non-magnetic material. An inner wall surface of the conduit 31 and end surfaces of the same continued to the inner wall surface are coated with an insulating material to thereby form a lining 32.

Plate-like cores 34 made of a magnetic material are provided in a plane perpendicular to the axis of the conduit 31 at its substantially central portion.

The thickness of each of the cores 34 is selected to be, for example, 0.1–0.8 times of the inside diameter of the conduit 31. As shown in the diagram (a) of FIG. 8, two substantially C-shaped cores 34 each having a notch portion at its one portion are combined with their notch portion sides made abut on each other, the conduit 31 being displaced within the notch portions. The vicinities of the notch portions of the respective cores 34 are extended in the diametrical direction of the conduit 31 and in the directions opposite to each other, and a pair of excitation coils 35 are wound on the opposing extended portions of the vicinities of the notch portions of the respective cores 34. By means of the excitation coils 35 thus wound on the respective extended portions of the cores 34, a magnetic field is formed from the one of the cores 34 on which one of the excitation coils 35 is wound toward the other core 34 on which the other excitation coil 35 is wound, the magnetic field being generated in a plane perpendicular to the axis of the conduit 31.

A pair of electrodes 33 are formed on the conduit 31 in the above-mentioned plane so as to be positioned in the direction perpendicular to the direction of the magnetic field. Each of the electrodes 33 is exposed on the surface of the lining 32, that is, a space portion in which fluid is caused to flow, and is drawn out in the state in which the electrodes 33 are electrically insulated from the conduit 31.

Further, a non-magnetic casing 36 is provided on the outer peripheral portion of the conduit 31 on which the cores 34 and the excitation coils 35 are provided, in a manner so that the casing 36 covers the cores 34 and the excitation coils 35, the casing 36 being connected to the conduit 31. As the material for the casing 36, for example, stainless steel or aluminum is preferable.

In the thus arranged electromagnetic flow meter (the detecting portion), the inter-surface distance between the end surfaces of the lining 32, which is formed on the inner walls and end surfaces of the conduit 31, is selected to be smaller than the inside diameter of the lining 32. Specifically, the inter-surface distance can be selected to be a value in a range of from 0.2 times to 1.0 times of the inside diameter.

Although the conduit 31 is made of a metallic material so as to have large mechanical strength, the conduit 31 may be made of an insulating material. In that case, the lining 32 becomes unnecessary. In the case where the conduit 31 is made of an insulating material, the inter-surface distance is defined as the distance between the end sections of the cylindrical conduit 31.

Figure 9:
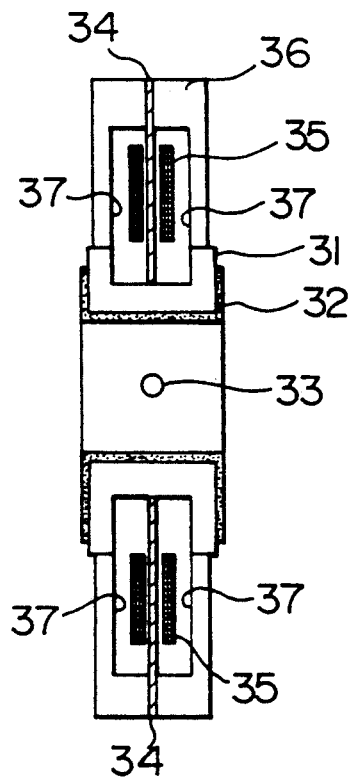
FIGS. 9 and 10 show the configurations of other embodiments of the electromagnetic flow meter according to the present invention respectively.

FIG. 9 shows another embodiment of the current detecting portion according to the present invention. FIG. 9 corresponds to the diagram (b) of FIG. 8. FIG. 9 is however different from the diagram (b) of FIG. 8 in the point that magnetic shield plates 37 are provided on the inner walls of the casing 36.

Figure 10:
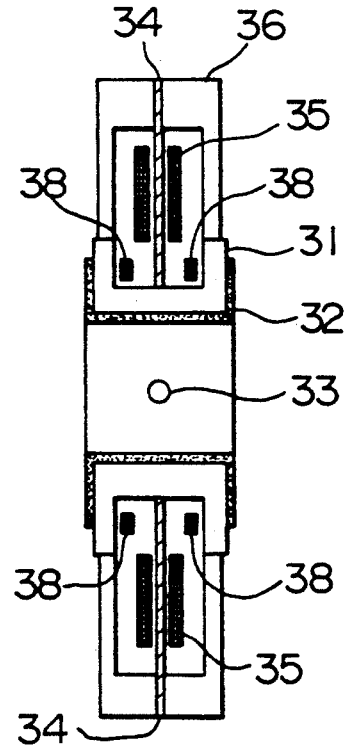

FIG. 10 shows a further embodiment of the present invention. FIG. 10 is different from the diagram (b) of FIG. 8 in the point that magnetic-erasing coils 38 are provided in the close vicinity of the conduit 31 and on the sides of the cores 34 opposite to each other in the axial direction of conduit 31.

Figure 11:
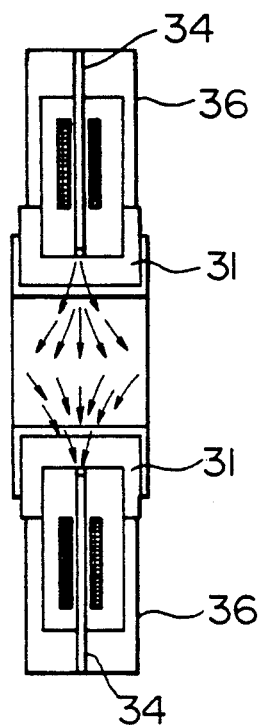
FIG. 11 is an explanatory view showing the state of magnetic flux in the electromagnetic flow meter depicted in FIG. 8.
Figure 12:
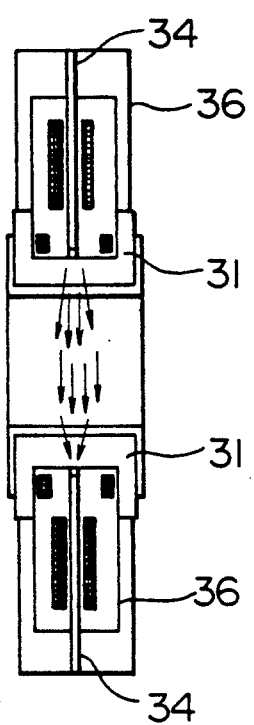
FIG. 12 is an explanatory view showing the state of magnetic flux in the electromagnetic flow meter depicted in FIG. 10.

In any of the embodiments shown in FIGS. 9 and 10, the generation of magnetic flux leakage as shown in FIG. 11 can be prevented as shown in FIG. 12 which shows the embodiment of FIG. 10 by way of example. The magnetic flux can be reduced to be within a plane containing the cores 34.

Figure 13:
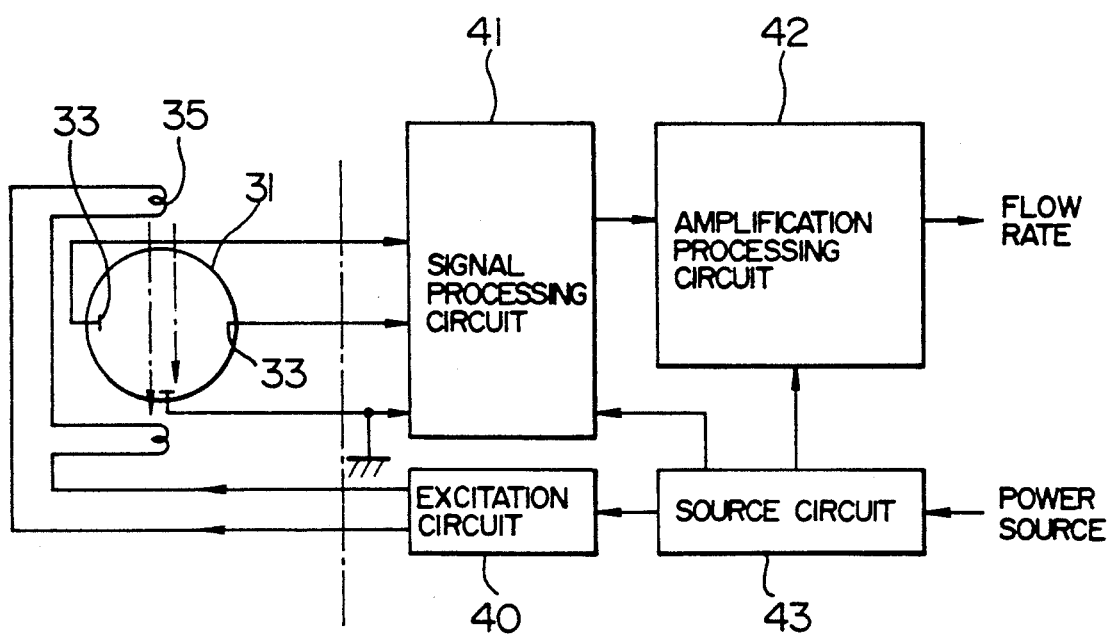
FIG. 13 is a block diagram showing the configuration of an embodiment in which peripheral circuits are connected to the above electromagnetic flow meter.

Referring to FIG. 13, an embodiment of the electromagnetic flow meter including the above-mentioned detector and circuits connected to the detector will be described hereunder.

The outputs of an excitation circuit 40 are supplied to the respective excitation coils 35 of the detector respectively, while the outputs of the electrodes 33 are supplied to a signal processing circuit 41. The output of the signal processing circuit 41 is taken out as an output signal through a signal amplification processing portion 42. The signal amplification processing portion 42 increases the reduction of the output of the signal processing circuit 41 though the output of the signal processing circuit 41 corresponds to the flow, the reduction being caused by the fact that the inter-surface distance is made smaller than the inside diameter in the embodiments shown in FIGS. 8 through 10.

The excitation circuit 40, the signal processing circuit 41, and the signal amplification processing portion 42 are fed with electric power from a source circuit 43.

In the foregoing embodiments, description has been made as to the electromagnetic flow meter (that is, the detector) per se. However, in the case where the detector is incorporated in a piping, a doughnut-like plate ring or the like is sometimes interposed between the piping and the detector. When the ring is an insulating body, the inter-surface distance is defined to be the distance between the end surfaces including the thickness of the insulator ring.

In FIG. 13, the signal processing circuit 41 and the signal amplification processing circuit 42 may be substituted for the correction operator 1 shown in FIG. 1. In this case, a highly accurate flow rate signal can be obtained at the output.

Figure 14:
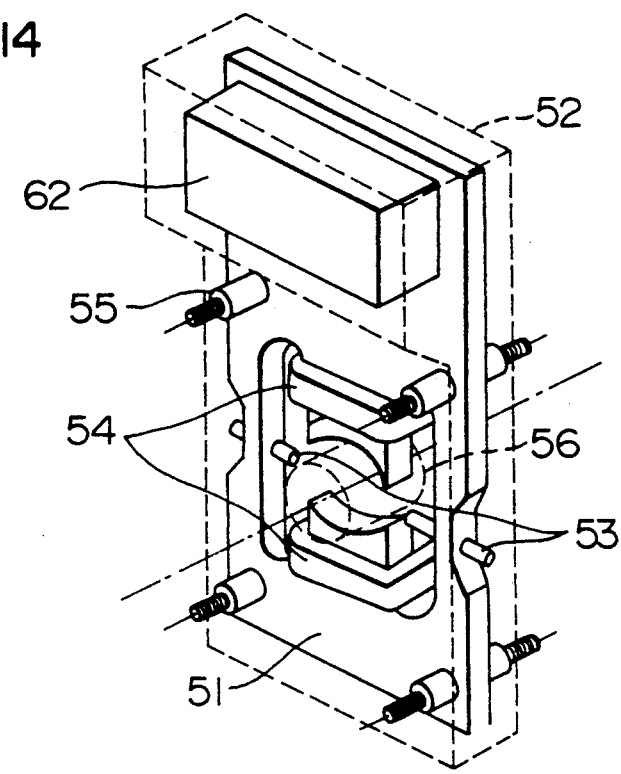
FIG. 14 is a view showing the configuration of a further embodiment of the electromagnetic flow meter according to the present invention.

FIG. 14 shows a further embodiment of the electromagnetic flow meter according to the present invention.

This embodiment has a structure in which the foregoing configurations are further developed so that the core is made to be a thin plate-like one and coils are directly wound on the core. Further, the flange used for connecting a mate piping is omitted, and piping attaching metal fittings directly and mechanically connected with the core are provided so that the electromagnetic flow meter can be mechanically connected with the mate piping and the whole mechanical strength can be secured. Further, the pipe constituting the conduit is omitted, and a conduit made of resin molding is used in place of the lining.

In FIG. 14, coils 54, a plate-like core 51 and electrodes 53 fixed on the plate-like core 51 are basic constituent elements of the electromagnetic flow meter. The core 51 is made of a magnetic material such as a silicon steel plate such that a plurality of silicon plates are laminated one on another to required thickness to thereby form the core 51. Flange attaching metal-fittings 55 to be used for connection with the mate piping are mechanically fixed on the core 51, so that whole stress generated in fastening the piping is borne by the flange attaching metal-fittings 55.

The whole of the detection portion of the flow meter is embedded in a resin molding 52 as shown by a broken line, and a conduit 56 is formed by the resin molding in the core 51 at its central portion. The ends of the electrodes 53 are projected out from the resin to thereby detect electromotive force of the fluid flowing in the conduit 56. In the resin molding process, if a low pressure modling method is employed, correction operating means 62 can be built in so that an output signal indicating the flow rate can be taken out directly.

In this case, if a communicator is connected to an output signal line so that setting or change can be performed through a communication so as to be operated through the communication when the setting or change is required, the correction operating means 62 can be completely embedded. The correction operating means 62 may have the same configuration as that of the correction operator 1 shown in FIG. 1. Alternatively, the output of the electrodes 53 may be corrected through a simple amplifying means.

Figure 15:
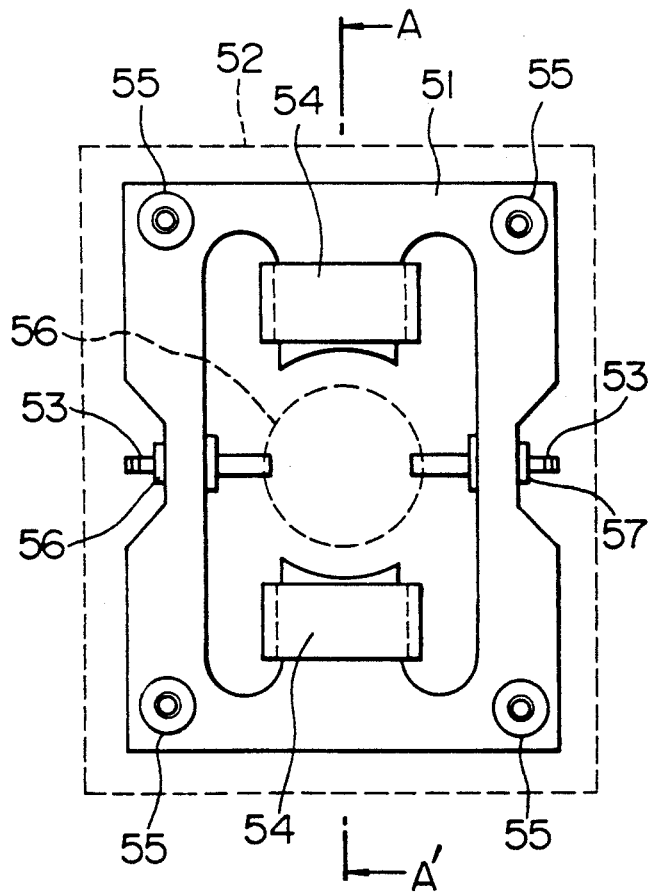
FIG. 15 is a view showing the configuration around the conduit portion of FIG. 14.

FIG. 15 illustrates the conduit 56 of FIG. 14 and the vicinity thereof more in detail. The electrodes 53 are fixed to the core 51 through insulating washers 57 respectively so that the electrodes 53 are electrically insulated from the core 51. The flange attaching metal-fittings 55 are fixed to the core 51 with a size according to the flange standard of the mate piping.

Figure 16:
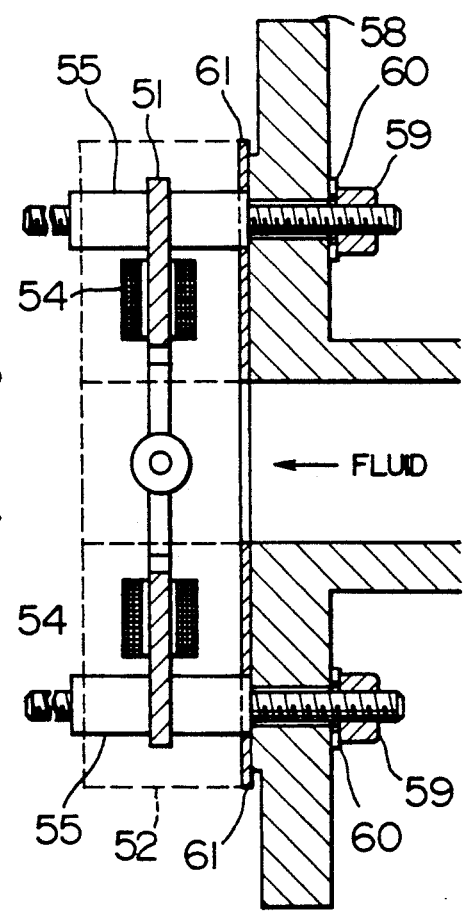
FIG. 16 is a view showing the state in which a flange of a mate piping is fixed in the sectional view along the line A—A' in FIG. 15.

FIG. 16 shows the state in which a flange 58 of the mate piping is fixed in the A—A' section of FIG. 15. In FIG. 16, the flange 58 is fixed at the step portion of the flange attaching metal-fittings 55 and fastened by nuts 59 through spring washers 60. A gasket 61 is provided between the flange 58 and the resin 52 for the purpose of sealing the fluid in the conduit 56.

In the case where an earth ring is required, a plate-like earth ring may be inserted between the gasket 61 and the resin 52.

In this embodiment, as described above, the plate like core 51 per se constitutes a magnetic circuit and further has sufficient rigidity so as to serve as a support for the whole of the detector. Further, the flange attaching metal-fittings 55 to be connected to the mate piping are mechanically fixed to the plate-like core 51 and have sufficient strength against the stress caused when the detector is attached and fixed to the flange of the mate piping. Further, the resin molding in which the whole including the core 51, the coils 54 and the electrodes 53 are embedded is formed through integral molding and therefore it is not necessary to prepare a conduit separately.

In such a configuration, the inter-surface distance is determined depending on the thickness of the core, the thickness of the coils, and the thickness of the resin molding covering over the core and the coils, and therefore if the thickness of the coils is reduced by making the coil length long, an electromagnetic flow meter having an extremely thin inter-surface distance can be realized. Moreover, since the whole of the connection portion with the outside is constituted by metal having sufficient mechanical strength in spite of the fact that the whole of the body is embedded in the resin molding, the same handling as that in the conventional one can be carried out with high reliability.

As described above, according to the present invention, it is possible to realize an electromagnetic flow meter which can not be affected by the material and shape of the mate piping and the flow distribution even if the inter-surface distance is made equal to or smaller than the inside diameter of the detector.

Further, since the inter-surface distance can be reduced, the weight of the detector is reduced so that the attachment of the detector to the mate-piping becomes easy and the cost can be reduced. Specifically, the effect due to the reduction in size as well as weight is large because the conventional work by two workers and reinforcing work can be reduced. Further, since the restriction in attachment is made less, the uses of the electromagnetic flow meter may be widened.

We claim:

1. An electromagnetic flow meter in which a magnetic field is generated by excitation coil means provided in the outside of a conduit and electromotive force generated in electrode means attached on said conduit is detected to thereby measure a flow rate of a fluid flowing in said conduit, said electromagnetic flow meter comprising:
   a parameter setting portion for setting parameters including piping conditions of a mate piping to which said conduit is connected;
   a span correction data storage portion for storing span correction data previously set correspondingly to said parameters; and
   a correction operation portion for correcting a detection signal from said electrode means on the basis of said correction data.

2. An electromagnetic flow meter according to claim 1, in which said parameter setting portion is arranged so as to set at least magnetic permeability and inside surface conductivity of said mate piping, and in which said span correction data storage portion is arranged so as to store correction data previously analyzed correspondingly to said respective parameters.

3. An electromagnetic flow meter according to claim 1, in which said parameter setting portion is arranged so as to set the shape and characteristics of said mate piping, and in which said span correction data storage portion is arranged so as to store correction data previously analyzed correspondingly to said shape and characteristics.

4. An electromagnetic flow meter according to claim 1, further comprising a parameter display portion for indicating parameters set in said parameter setting portion.

5. An electromagnetic flow meter in which a magnetic field is generated by excitation coil means provided in the outside of a conduit and electromotive force generated in electrodes attached on said conduit is detected to thereby measure a flow rate of a fluid flowing in said conduit, said electromagnetic flow meter comprising:
   a detection portion in which an axial length of said conduit is selected so as to be shorter than an inside diameter of said conduit; and
   correction means for correcting an output of said detection portion in accordance with conditions of a mate piping to which said detection portion is connected.

6. An electromagnetic flow meter according to claim 5, in which said correction means includes:
   a parameter setting portion for setting parameters including piping conditions of said mate piping to which said detection portion is connected;
   a span correction data storage portion for storing span correction data previously set correspondingly to said parameters; and
   a correction operation portion for correcting a detection signal from said detection portion on the basis of said correction data.

7. An electromagnetic flow meter according to claim 5, in which said correction means is integrally built in said electromagnetic flow meter.

8. An electromagnetic flow meter comprising:
   a conduit in which an electrically conductive fluid flows;
   a magnetic circuit for making a magnetic field act on said conduit perpendicularly thereto, wherein said magnetic circuit includes:
   a core made up of a sheet of or a plurality of laminated sheets of magnetic material and disposed perpendicularly to said axial direction of said conduit;
   projecting pole portions formed on said core at said conduit sides thereof; and
   excitation coils wound around said projecting pole portions respectively;
   a pair of electrodes disposed on a wall of said conduit in opposition to each other in a direction perpendicular to a direction of flow of said electrically conductive fluid; and
   an amplifier for amplifying an output of said electrodes is built in said electromagnetic flow meter an extended portion of said core, wherein an axial length of said conduit is selected so as to be shorter than an inside diameter of said conduit.

9. An electromagnetic flow meter according to claim 8, in which a ratio of the axial length of said conduit to the inside diameter of said conduit is set to a value within a range of from 0.2 to 1.0.

10. An electromagnetic flow meter comprising:
    a conduit portion in which a fluid to be measured is made to flow, a magnetic circuit for exerting a magnetic field onto said conduit portion perpendicularly to an axial direction of said conduit portion, and a pair of electrodes are arranged in positions opposite to each other to perpendicularly intersect both a direction of flow of said fluid and a direction of said magnetic field, wherein said magnetic circuit comprises:
    a core made up of a sheet of or a plurality of laminated sheets of magnetic material and disposed perpendicularly to said axial direction of said conduit portion;
    projecting pole portions formed on said core at said conduit sides thereof; and
    excitation coils wound around said projecting pole portions respectively;
    wherein said electrodes are disposed in a position so as to perpendicularly intersect said projecting pole portions of said core and fixedly arranged on said core so as to penetrate said core through insulators.

11. An electromagnetic flow meter comprising a conduit portion in which a fluid to be measured is made to flow, a magnetic circuit for exerting a magnetic field onto said conduit portion perpendicularly to an axial direction of said conduit portion, and a pair of electrodes arranged in a position so as to be in opposition to each other and so as to perpendicularly intersect a direction of flow of said fluid, in which said magnetic circuit includes a core made of a sheet of or a plurality of laminated sheets of magnetic material and disposed perpendicularly to the axial direction of said conduit portion, and in which flange attaching metal-fittings for attaching a flange of a mate piping to which said conduit portion is to be connected are provided on said core.

12. An electromagnetic flow meter comprising a conduit portion in which a fluid to be measured is made to flow, a magnetic circuit for exerting a magnetic field onto said conduit portion perpendicularly to an axial direction of said conduit portion, and a pair of electrodes arranged in a position so as to be in opposition to each other and so as to perpendicularly intersect a direction of flow of said fluid, in which said electromagnetic flow meter further comprises a core made of a sheet of or a plurality of laminated sheets of magnetic material so as to serve as said magnetic circuit as well as a support, said electrodes being mechanically fixed to said core through insulators, flange attaching metal-fittings mechanically fixed to said core, and coil means fixed on projecting pole portions of said core, said core, said electrodes, said flange attaching metal-fittings and said coil means being integrally embedded in resin molding, and in which an axial length of said conduit portion is selected so as to be shorter than an inside diameter of said conduit portion.

13. An electromagnetic flow meter according to claim 12, further comprising correction means for correcting a detection signal from said electrodes in accordance with conditions of a mate piping to which said conduit portion is to be connected.

14. An electromagnetic flow meter according to claim 13, in which said correction means is fixed on said core and said correction means is embedded in said resin molding together with said core.

15. An electromagnetic flow meter according to claim 12, in which a gasket is interposed between a contact surface of said resin molding and a mate piping to which said conduit portion is to be connected, and a plate-like earth ring is provided between said contact surface and said gasket.

16. In an apparatus for measuring a flow rate by using an electromagnetic flow meter, an electromagnetic flow measurement correction device comprising: a parameter setting portion for setting parameters including conditions of a mate piping to which said electromagnetic flow meter is connected; a storage portion for storing span correction data previously set correspondingly to said parameters; and a correction operation portion for correcting a detection signal from said electromagnetic flow meter on the basis of said correction data to thereby output a flow rate measurement signal.

17. An electromagnetic flow measurement correction device according to claim 16 in which said parameter setting portion is arranged so as to set at least permeability and inside surface conductivity for every flange standard of said mate piping, and said span correction data storage portion is arranged so as to store correction data previously analyzed correspondingly to said parameters.

18. An electromagnetic flow measurement correction device according to claim 16, in which said parameter setting portion is arranged so as to set the shape and characteristics of said mate piping, and in which said span correction data storage portion is arranged so as to store correction data previously analyzed correspondingly to said shape and characteristics.

* * * * *